(12) United States Patent
Utille (10) Patent No.: US 11,852,182 B2
(45) Date of Patent: Dec. 26, 2023

(54) DEVICE FOR VIEWING TENSION LOSS IN AN ASSEMBLY

(71) Applicant: Lionel Utille, Faverges-Seythenex (FR)

(72) Inventor: Lionel Utille, Faverges-Seythenex (FR)

( * ) Notice: Subject to any disclaimer, the term of this patent is extended or adjusted under 35 U.S.C. 154(b) by 341 days.

(21) Appl. No.: 17/430,028

(22) PCT Filed: Feb. 13, 2020

(86) PCT No.: PCT/EP2020/053798
§ 371 (c)(1),
(2) Date: Aug. 11, 2021

(87) PCT Pub. No.: WO2020/169450
PCT Pub. Date: Aug. 27, 2020

(65) Prior Publication Data
US 2022/0128081 A1    Apr. 28, 2022

(30) Foreign Application Priority Data

Feb. 19, 2019 (FR) ........................... 1901637

(51) Int. Cl.
*F16B 31/02* (2006.01)

(52) U.S. Cl.
CPC ............ *F16B 31/028* (2013.01); *F16B 31/02* (2013.01)

(58) Field of Classification Search
CPC ........ F16B 31/02; F16B 31/028; F16B 31/04; F16B 43/00; G01L 5/24; G01L 5/243
USPC ....................... 411/8, 9, 10, 11, 12
See application file for complete search history.

(56) References Cited

U.S. PATENT DOCUMENTS

| 3,183,762 A | * | 5/1965 | Ougljesa | ................. F16B 31/04 411/12 |
| 3,306,154 A | | 2/1967 | Bailey | |
| 3,474,701 A | | 10/1969 | Setzler | |
| 4,889,457 A | | 12/1989 | Hageman | |
| 4,958,970 A | * | 9/1990 | Rose | ....................... F16B 39/24 411/12 |
| 5,188,494 A | * | 2/1993 | Hatin | .................... F16B 31/028 411/13 |

(Continued)

FOREIGN PATENT DOCUMENTS

| DE | 4428721 A1 | 4/1995 |
| FR | 2906854 | 10/2006 |
| WO | WO-200711894 A1 | 10/2007 |

OTHER PUBLICATIONS

International Search Report for Corresponding International Application No. PCT/EP2020/053798, dated Apr. 17, 2020 (9 pages).

*Primary Examiner* — Roberta S Delisle
(74) *Attorney, Agent, or Firm* — Harris Beach PLLC (57) ABSTRACT

The invention relates to a device for viewing tension loss in a structure, by engagement with a threaded rod, being carried out, for example, by a bolt made up of a screw, a nut, and consisting of two non-deformable washers comprising an inner face, an outer face, an outer peripheral wall and an inner peripheral wall delimiting a central opening and a diametrically deformable viewing ring sandwiched between the two non-deformable washers, characterized in that the ring is crush-resistant and the thickness of at least one of the washers decreases from the center of the washer towards the peripheral end thereof, the smallest thickness thus being located towards the peripheral end of at least one washer.

13 Claims, 6 Drawing Sheets

(56) References Cited

U.S. PATENT DOCUMENTS

| | | | |
|---|---|---|---|
| 6,425,718 B1 * | 7/2002 | Herr ..................... | F16B 31/028 411/13 |
| 2003/0194287 A1 * | 10/2003 | Hageman .............. | F16B 31/028 411/9 |
| 2004/0200290 A1 * | 10/2004 | Almanstoetter ........ | G01L 5/243 73/761 |
| 2008/0095595 A1 * | 4/2008 | Maruyama ............ | F16B 31/028 73/761 |
| 2021/0324897 A1 * | 10/2021 | Brekke ................ | F16B 43/009 |

* cited by examiner

DEVICE FOR VIEWING TENSION LOSS IN AN ASSEMBLY

CROSS-REFERENCE TO RELATED APPLICATIONS

This application is a national stage application under 35 U.S.C. § 371 of PCT Application No. PCT/EP2020/053798, filed on Feb. 13, 2020, which claims priority to and the benefit of French Application No. 1901637 filed on Feb. 19, 2019, which are incorporated herein by reference in their entirety.

The present invention relates to a device for viewing tension loss in an assembly.

Parts assembled by bolts, i.e. a nut and a screw, or by nuts mounted on studs, are found in very many products.

In some applications, it is very important to ensure a given tightening of the nut. This is for example the case with assembling elements of a crane, or securing a pylon to the ground, a structure of a travelling crane, a mechanical ascending tower, a nacelle or the like, such as for example a fairground ride such as a rollercoaster.

In order to allow a given tightening of the assembly nuts, the constructors propose torque wrenches or screwdrivers, the tightening of which is calibrated and determined. However, the use of such means does not make it possible to carry out a visual check of the tension loss in a structure, which is a serious handicap for assembled structures sometimes comprising hundreds or even thousands of nuts. In addition, these means do not prevent unwanted slackening that is not visible, and which presents a serious and dangerous drawback.

There are devices making it possible to view the tightening of a nut that to our knowledge are not used, for reasons of inefficacy and/or premature wear. In particular, devices, using an elastomer that forms, once crushed, a peripheral projection projecting beyond the washer once tightening has been carried out.

The object of the present invention is to solve the aforementioned drawbacks and proposes a viewing device that is particularly simple, inexpensive and reliable.

The device for viewing loss of tension in an assembly of the invention, intended for assembling two elements of a structure, by cooperation with a threaded rod once the assembly has been carried out, for example, by a bolt consisting of a screw, a nut, and composed of two non-deformable washers having an inner face, an outer face, an outer peripheral wall and an inner peripheral wall delimiting a central opening, and a deformable viewing ring diametrically sandwiched between the two non-deformable washers. The thickness of at least one of the washers or of both washers of the invention decreases from the centre of the washer or washers towards its or their peripheral end or ends.

The invention is also characterised in that at least one of the non-deformable washers comprises, on its inner face, a central projection, the inner face of which is intended, after tightening, to come into abutment against the inner face of another washer. However, for certain requirements, the two non-deformable washers comprise, on their inner face, a central projection intended, after tightening, to come into abutment.

Thus one of the washers of the invention has a diameter greater than the diameter of the other washer in order to reveal the inner face of one of the washers, advantageously covered with a colour.

The deformable ring of the invention is produced from metal. It may therefore be implemented by a toroidal spring of the helical type, wherein the two ends of the wire are secured together. It may also be implemented in a solid material and cut in its cross section to allow diametral deformation.

Thus the form of the cross section of the ring may be a trapezial quadrilateral, or any trapezoidal profile where one of the parallel sides is oriented towards the peripheral exterior of the washers.

The viewing device according to the invention includes bearing balls disposed on the surfaces of the ring and intended to be in sliding contact with the inner faces of the non-deformable washers, thus facilitating the movement of said ring.

For an axial thrust to be provided, forcing separation in the event of slackening of the device, it includes a spring element disposed between the non-deformable washers. And to allow the positioning and holding of the spring element, at least one of the washers is provided with a circular groove on its inner face, close to the central opening of said washer.

Other features and advantages of the invention will emerge from the following description with regard to the accompanying drawings, which are given only by way of non-limitative examples.

Figure 1:
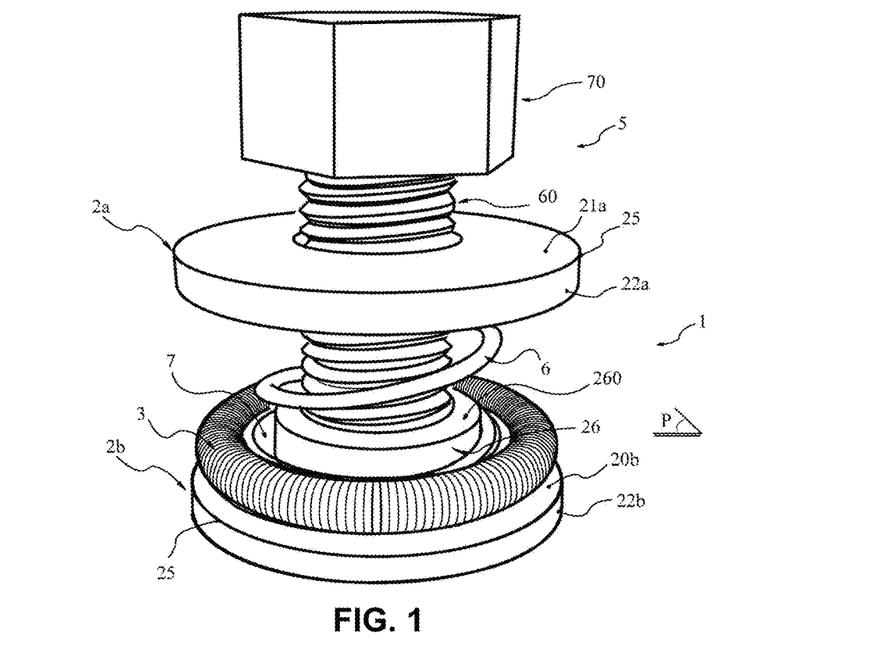
FIGS. 1 and 2 illustrate the device of the invention in perspective according to two different embodiments.
Figure 2:
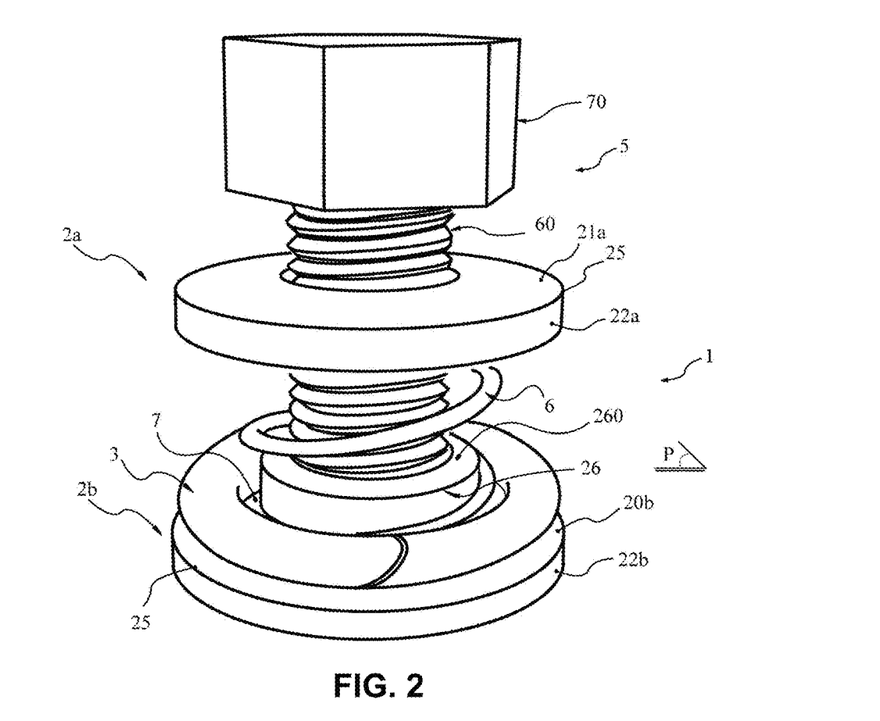
Figure 3:
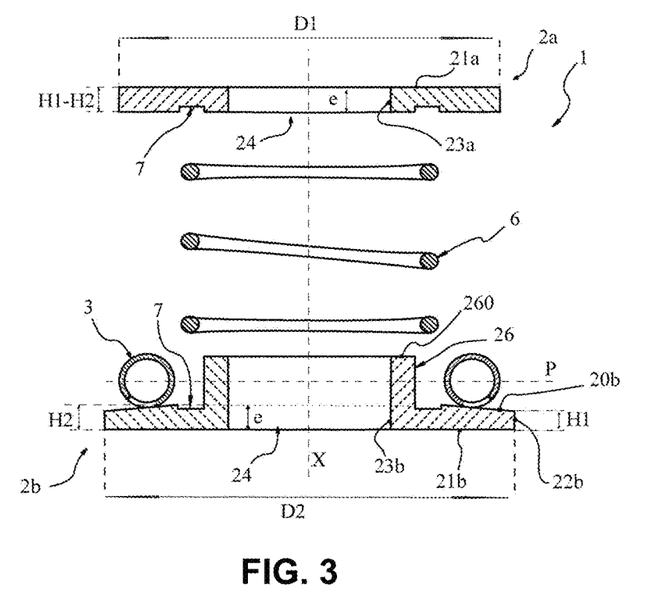
FIGS. 3 and 4 illustrate in cross section the device of the invention in the course of assembly, according to two different embodiments.
Figure 4:
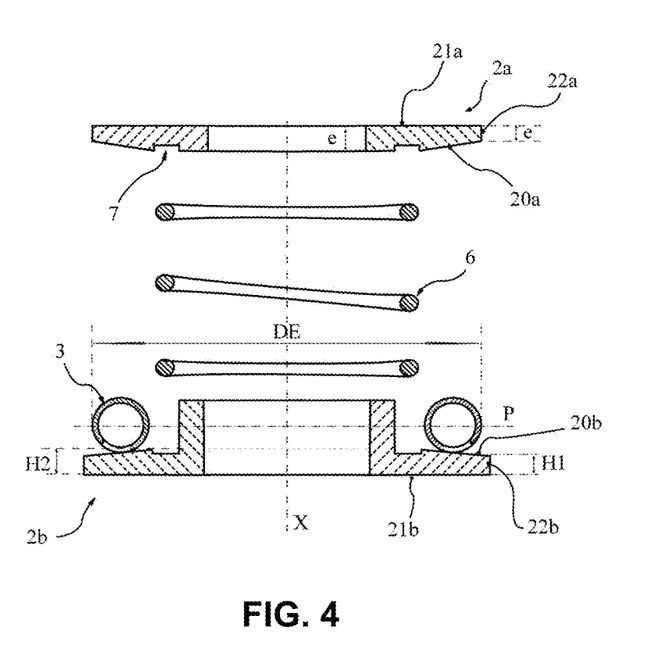
Figure 5A:
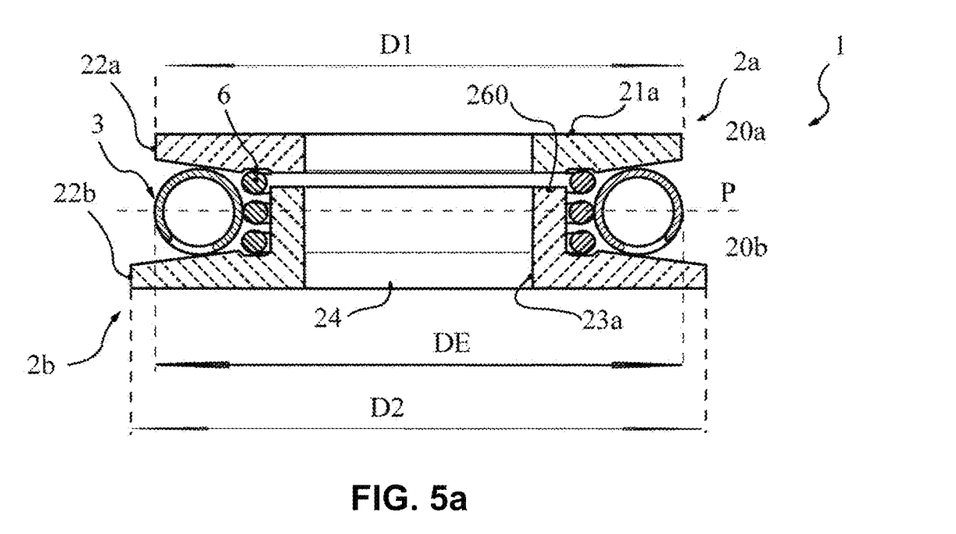
FIG. 5a illustrates in cross section the device according to the preferred embodiment of the invention, showing the fact that tightening has not been carried out.
Figure 5B:
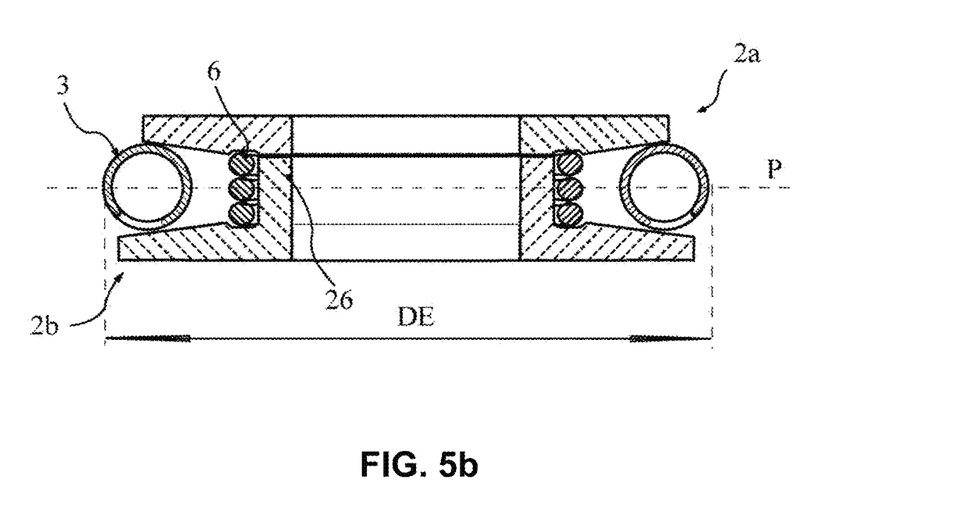
FIG. 5b illustrates in cross section the device of FIG. 5a, once tightening has been carried out.
Figure 6A:
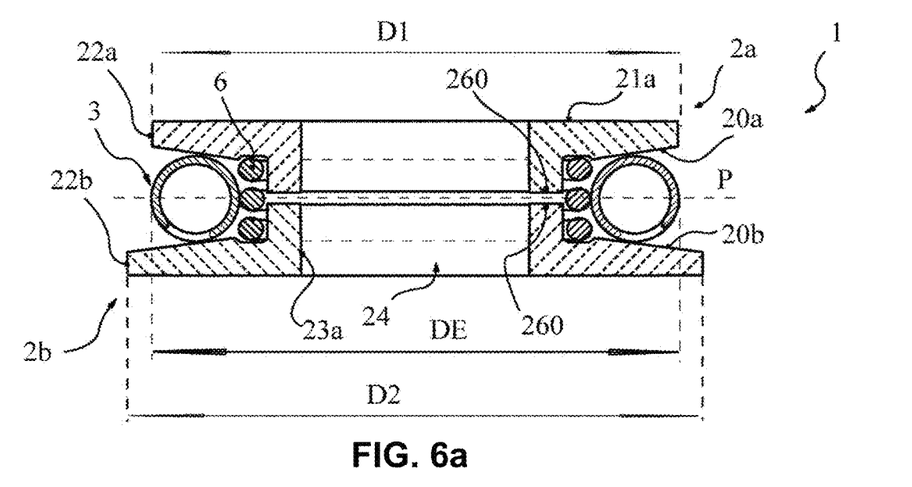
FIG. 6a illustrates in cross section the device according to a second embodiment of the invention, showing the fact that tightening has not been carried out.
Figure 6B:
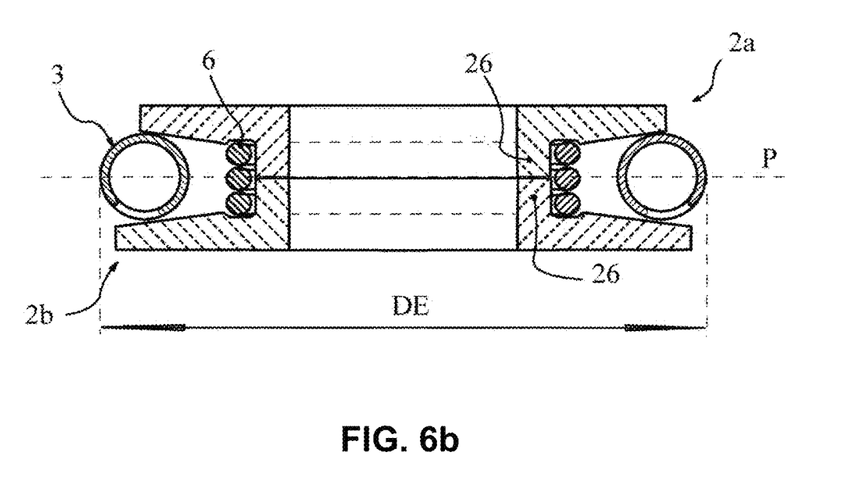
FIG. 6b illustrates in cross section the device of FIG. 6a, once tightening has been carried out.
Figure 7A:
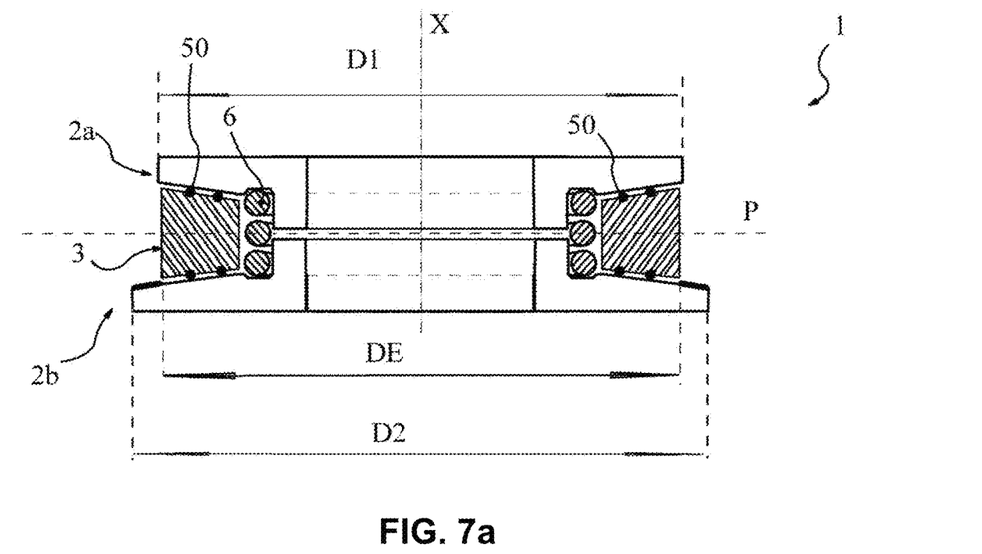
FIG. 7a illustrates in cross section the device according to another embodiment, showing the fact that tightening has not been carried out.
Figure 7B:
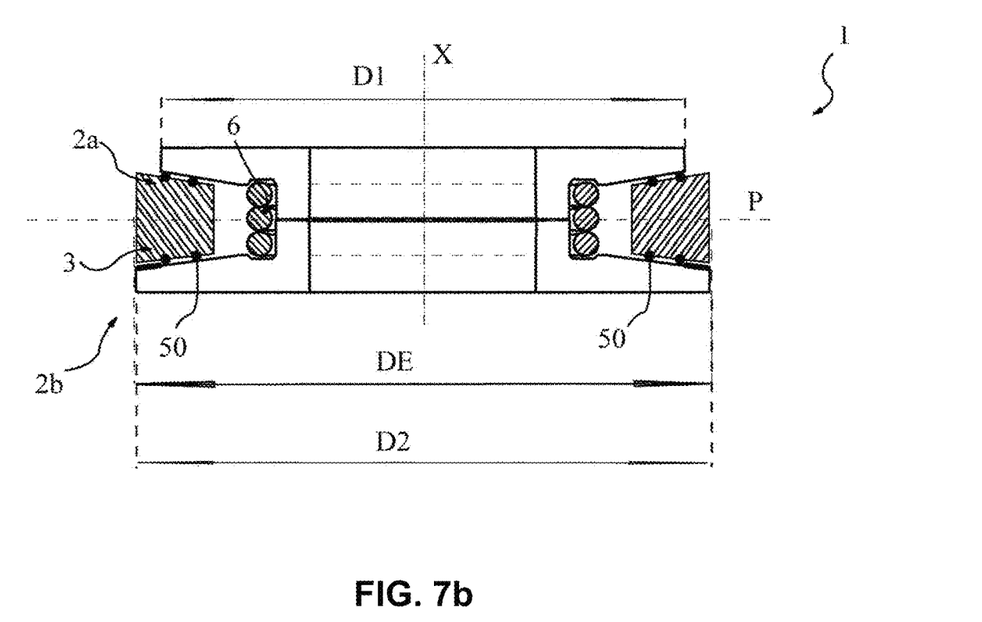
FIG. 7b illustrates in cross section the device of FIG. 7a, once tightening has been carried out.
Figure 8A:
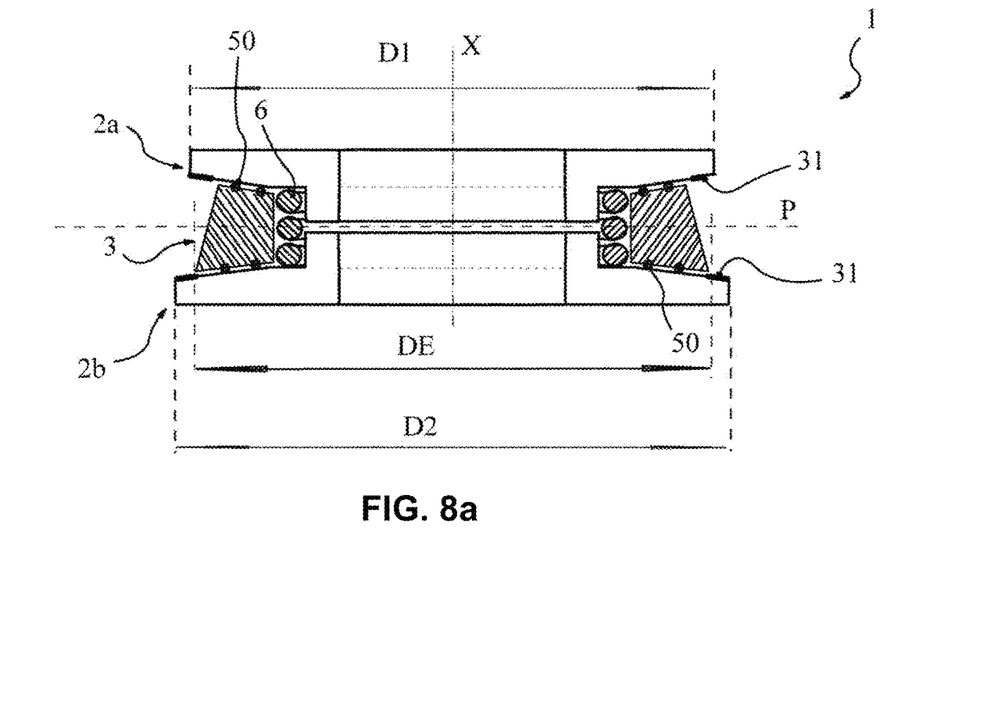
FIG. 8a illustrates in cross section the device according to yet another embodiment, showing the fact that tightening has not been carried out.
Figure 8B:
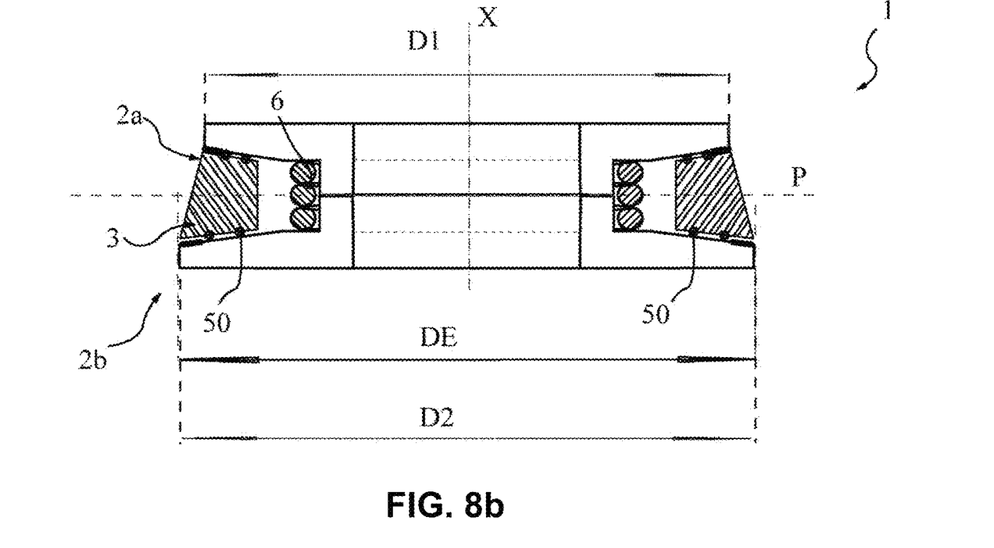
FIG. 8b illustrates in cross section the device of FIG. 8a, once tightening has been carried out.

The viewing device (1) is intended to be used for assembling two elements forming part of a structure, the assembly being implemented, for example, by a bolt (5) consisting of a screw (60) and a nut (70), The structure may for example be a crane and the assembly relates, for example, to two profiled sections, but the structure may also be a pylon fixed to the ground by means of studs embedded in a block of concrete. Naturally the invention may relate to all types of structure or assembly without departing from the scope of the invention.

According to the invention, the viewing device (1) constitutes a viewing and assembly washer, intended to be placed under the nut (7), comprising an elastically deformable element (3) disposed between non-deformable elements (2a, 2b) and which is moved and deformed when said nut is tightened.

The non-deformable elements (2a, 2b) are formed by at least one washer produced from a non-deformable material.

Thus the preferred embodiment of the device of the invention is composed of two non-deformable washers (2a, 2b), each forming a disc including an inner face (20a, 20b), an outer face (21a, 21b), an outer peripheral wall (22a, 22b) and an inner peripheral wall (23a, 23b) delimiting a central opening (24) and a deformable viewing ring (3) diametrically sandwiched between the two non-deformable washers (2a, 2b).

Therefore, according to the preferred embodiment of the invention, at least one of the washers (2a, 2b) has a cross section in the general form of a right-angled trapezium, the inclined portion of which is positioned towards the inside of the device.

According to other variants, the cross section is in the form of a triangle, or an isosceles trapezium.

According to a main feature of the invention, the thickness (e) of at least one of the washers (2a, 2b) decreases from the centre (24) of the washer towards the peripheral end (25) thereof. Thus the inner face of at least one of the washers forms a slope oriented outwards. In other words, the height (H2) of the inner peripheral wall (23a, 23b) is greater than the height (H1) of the outer peripheral wall (22a, 22b). Said outwardly oriented slope, produced by the inner face (20a, 20b) of at least one washer (2a, 2b), pushes the ring (3) and deforms it diametrically to make it appear at the outer periphery (22a, 22b) of at least one washer (2a, 2b), during tightening.

Therefore, according to the preferred embodiment of the invention, the thickness (e) of each washer decreases from the centre of the washer (24) towards the outer peripheral end (25) thereof and the space between the two washers enlarges towards the peripheral exterior (EXT) of the device (1).

According to the preferred embodiment of the invention, the washers (2a, 2b) each include a different diameter (D1, D2).

The diameters (D1, D2) of the washers (2a, 2b) being different, the upper washer (2a) advantageously being the smaller, and with a diameter (D1) smaller than the diameter (D2) of the lower washer (2b), allows visual access to at least a portion of the inner surface (20b) of the lower washer (2b).

The viewing ring (3) is therefore sandwiched between the two washers (2a, 2b), more particularly in a space open at the outer periphery. Since the space decreases during tightening, the ring is pushed outwards.

Therefore, during tightening, the ring (3) at least partly projects beyond the outer periphery of the upper washer (2a), making it possible at a simple glance to note whether the inner face (20b) of the lower washer (2b) is visible.

Thus, to facilitate viewing the slackening, and according to the preferred embodiment of the invention, the inner face (20a, 20b) is coloured on its part close to the outer periphery of the washer.

The viewing device (1) therefore consists of an extensible and diametrically retractable deformable ring (3) making it possible to reduce or increase the outside diameter (DE) thereof, produced from elastic material. The elastically deformable element (3) and the inner face (20a, 20b) of one of the washers (2a, 2b) therefore produce a means for viewing tension loss in an assembly.

According to one feature of the invention, at least one of the non-deformable washers (2a, 2b) comprises, on the inner face thereof, a central projection (26) the inner face (260) of which is intended, after tightening, to come into abutment against the inner face (20a) of the other washer (2a, 2b).

According to another variant embodiment, the two washers (2a, 2b) include a central projection intended to be in contact with each other.

The projection or projections implement the mechanical stop of the device, on which the tightening force bears.

According to the invention, the deformable viewing ring (3) is produced from a material resistant to wear, UV and other stresses. Thus, according to the preferred embodiment of the invention, the deformable ring (3) is produced from a metallic material. The deformable ring is therefore advantageously produced from metal. According to other embodiments, the ring is produced from composite materials such as carbon, or resin.

According to the invention, the deformable ring (3) is therefore diametrically extensible and retractable, or in other words the ring is crush resistant and deforms solely diametrically. The ring, including a diametral plane (P) and a central axis (X), substantially perpendicular to each other, deforms solely in the diametral plane (P).

According to the invention the deformable ring is implemented by a toroidal spring of the helical type, wherein the two ends of the wire are secured together. And the turns of which are disposed substantially perpendicular to the diametral plane (P) of the ring (3).

Said spring has a cylindrical cross section.

However, and without departing from the field of the invention, the cross section of the spring has a flat located on the outside diameter of the ring.

During tightening, the pressure exerted on it pushes the turns of the spring to separate from each other, producing a spring that is greater in diameter (DE) and thus projecting beyond the periphery (25) of at least one of the washers (2a, 2b).

According to a variant embodiment, the deformable ring (3) is produced from a solid material and cut in its cross section to allow diametral deformation.

And, according to another variant embodiment, the deformable ring (3) is produced in a hollow tubular profiled section and cut in its cross section.

According to other variant embodiments, the cross section of the ring (3) forms a trapezial quadrilateral or a triangle.

The ring (3) includes a profile with a trapezoidal cross section, one of the parallel sides of which is oriented towards the peripheral outside (25, EXT) of the washers (2a, 2b).

The ring (3) includes bearing balls (50) disposed on the surfaces intended to be in sliding contact with at least one of the inner faces (20a, 20b) of the non-deformable washers (2a, 2b), thus facilitating its movement. And, according to the preferred embodiment of the invention, the bearing balls are in contact with the two inner faces of the washers.

It will have been understood that, during the tightening of the nut (7), the deformable ring forms a peripheral projection constituting an indicator of correct tightening.

It will also have been understood that, if the nut happens to slacken, the deformable ring retracts and the peripheral projecting part disappears at least partly.

Thus, through a simple glance at the bolts of the structure, the user can note whether one or other of them are all or partly slackened.

According to the preferred embodiment of the invention, for an axial thrust on the nut to be provided, forcing separation in the event of slackening, the device includes a spring element (6) disposed between the two non-deformable washers (2a, 2b).

Said spring element (6) is advantageously a helical thrust spring.

Naturally the dimensions and the elastic characteristics of the material will be selected according to the result to be obtained.

According to another feature of the invention, at least one of the two washers (2a, 2b) is provided with a circular groove (7), close to the central opening (24) of said washer (2a, 2b). The function of this groove is to position and hold the thrust spring (6). This is because at least one of the ends of said spring is positioned in this groove (7). According to the preferred embodiment of the invention, the two washers (2a, 2b) are provided with a circular groove (7) for positioning the spring (6).

In addition, the two washers (2a, 2b) are constrained to rotate together by means of clipping, adhesive bonding or welding, implemented by ultrasound or vibration, or even by a connection of the mechanical type.

Let us note also that the ring (3) of the invention may be coloured, such as for example in yellow, red, orange, blue or phosphorescent or retroreflecting to improve visibility thereof.

The invention claimed is:

1. Device for viewing tension loss in a structure, by cooperation with a threaded rod, being implemented, for example, by a bolt consisting of a screw and a nut, and composed of two non-deformable washers including an inner face, an outer face, an outer peripheral wall and an inner peripheral wall delimiting a central opening and a diametrically deformable viewing ring sandwiched between the two non-deformable washers, characterized in that the ring including a diametral plane and a central axis, substantially perpendicular to each other, is crush resistant, and deforms solely in the diametral plane, and the thickness of at least one of the washers decreases from the center of the washer towards the peripheral end thereof, the smallest thickness being therefore located towards the peripheral end of at least one washer.

2. Viewing device according to claim 1 characterized in that one of the washers includes a diameter greater than the diameter of the other washer.

3. Viewing device according to claim 1, characterized in that at least one of the non-deformable washers comprising on the inner face thereof a central projection the inner face of which is intended, after tightening, to come into abutment against the inner face of another washer.

4. Viewing device according to claim 1 in that two non-deformable washers comprise, on the inner face thereof, a central projection wherein their inner faces are intended, after tightening, to come into abutment against each other.

5. Viewing device according to claim 1 characterized in that the thickness of the two washers decreases from the center of each washer towards their peripheral end, the smallest thickness being therefore located towards the peripheral end of each washer.

6. Viewing device according to claim 1 characterized in that the inner face of one of the washers is coated with a color.

7. Viewing device according to claim 1 characterized in that the deformable ring is implemented by a toroidal spring of the helical type, the two ends of the wires of which are secured together.

8. Viewing device according to claim 1 characterized in that the deformable ring is produced from a solid material and cut in its cross section to allow diametral deformation.

9. Viewing device according to claim 1 characterized in that the cross section of the ring forms a trapezial quadrilateral.

10. Viewing device according to claim 1 characterized in that the ring includes a profile with a trapezoidal cross section one of the parallel sides of which is oriented towards the peripheral exterior of the washers.

11. Viewing device according to claim 1, characterized in that the ring includes bearing balls disposed on the surfaces intended to be in sliding contact with the inner faces of the non-deformable washers, thus facilitating its movement.

12. Viewing device according to claim 1 characterized in that it includes a spring element disposed between the non-deformable washers so that an axial thrust is provided, forcing separation thereof in the event of slackening of the device.

13. Viewing device according to claim 1 characterized in that the deformable ring is produced from metal.

* * * * *